(12) United States Patent
Yang et al.

(10) Patent No.: US 11,521,495 B2
(45) Date of Patent: *Dec. 6, 2022

(54) METHOD, APPARATUS, DEVICE AND READABLE STORAGE MEDIUM FOR PLANNING PASS PATH

(71) Applicant: BEIJING BAIDU NETCOM SCIENCE TECHNOLOGY CO., LTD., Beijing (CN)

(72) Inventors: Fan Yang, Beijing (CN); Fan Zhu, Beijing (CN); Weicheng Zhu, Beijing (CN); Leibing Lv, Beijing (CN); Lin Ma, Beijing (CN)

( * ) Notice: Subject to any disclaimer, the term of this patent is extended or adjusted under 35 U.S.C. 154(b) by 404 days.

This patent is subject to a terminal disclaimer.

(21) Appl. No.: 16/704,005

(22) Filed: Dec. 5, 2019

(65) Prior Publication Data

US 2020/0184824 A1  Jun. 11, 2020

(30) Foreign Application Priority Data

Dec. 5, 2018  (CN) .......................... 201811483018.6

(51) Int. Cl.
*G08G 1/16* (2006.01)
*G05D 1/00* (2006.01)
(Continued)

(52) U.S. Cl.
CPC ............ *G08G 1/167* (2013.01); *B60W 40/04* (2013.01); *G05D 1/0088* (2013.01);
(Continued)

(58) Field of Classification Search
None
See application file for complete search history.

(56) References Cited

U.S. PATENT DOCUMENTS

2017/0072565 A1* 3/2017 Egerstedt ............... B25J 9/1682
2018/0345963 A1* 12/2018 Maura ................... G05D 1/0088
(Continued)

FOREIGN PATENT DOCUMENTS

CN     101833702 A    9/2010
CN     103278164 A    9/2013
(Continued)

OTHER PUBLICATIONS

First Office Action in CN Patent Application No. 201811483018.6 dated May 27, 2021.
(Continued)

*Primary Examiner* — Santiago Garcia
(74) *Attorney, Agent, or Firm* — Dilworth IP, LLC (57) ABSTRACT

The present disclosure provides a method, an apparatus, a device and a readable storage medium for planning a pass path. The method includes: acquiring current road environment information in front of a vehicle; setting pass candidate points according to the current road environment information and a driving strategy; and determining a current optimal passable path according to the pass candidate points. Since the pass candidate points are set according to the current road environment information and the driving strategy, and the current optimal passable path is determined according to the pass candidate points, thereby effectively decreasing the calculation amount of the impassable path calculation in prior art due to direct setting of pass candidate points in all areas in front of an unmanned vehicle.

18 Claims, 6 Drawing Sheets

(51) Int. Cl.
  *G05D 1/02* (2020.01)
  *B60W 40/04* (2006.01)
  *G08G 1/01* (2006.01)
  *G06V 20/56* (2022.01)

(52) U.S. Cl.
  CPC ........... *G05D 1/0214* (2013.01); *G06V 20/56* (2022.01); *G08G 1/0112* (2013.01); *B60W 2554/00* (2020.02); *B60W 2554/801* (2020.02); *G05D 2201/0213* (2013.01)

(56) References Cited

U.S. PATENT DOCUMENTS

| | | | | |
|---|---|---|---|---|
| 2019/0337531 A1* | 11/2019 | Oe | ......................... | B60W 40/09 |
| 2020/0183401 A1* | 6/2020 | Yang | ....................... | G08G 1/167 |
| 2021/0055115 A1* | 2/2021 | Kawabata | .............. | G01C 21/32 |
| 2021/0261162 A1* | 8/2021 | Hiramatsu | ............. | G08G 1/167 |

FOREIGN PATENT DOCUMENTS

| | | |
|---|---|---|
| CN | 103699136 A | 4/2014 |
| CN | 103760904 A | 4/2014 |
| CN | 104914870 A | 9/2015 |
| CN | 105091884 A | 11/2015 |
| CN | 107037812 A | 8/2017 |
| CN | 107843267 A | 3/2018 |

OTHER PUBLICATIONS

Notice of Allowance in CN Patent Application No. 201811483018.6 dated Jan. 10, 2022.

* cited by examiner

METHOD, APPARATUS, DEVICE AND READABLE STORAGE MEDIUM FOR PLANNING PASS PATH

CROSS-REFERENCE TO RELATED APPLICATION

This application claims priority to Chinese Patent Application No. 201811483018.6, filed on Dec. 5, 2018, which is hereby incorporated by reference in its entirety.

TECHNICAL FIELD

The present disclosure relates to the field of unmanned driving technologies and, in particular, to a method, an apparatus, a device and a readable storage medium for planning a pass path.

BACKGROUND

With the development of computer technologies and the artificial intelligence, unmanned driving vehicles (for short: unmanned vehicle) have been widely applied in transportation, militaries, logistic storage, daily lives and so forth. The unmanned driving technologies mainly include perception of environmental information, intelligent decision-making of driving behaviors, planning of collision-free paths, motion control of vehicles and the like. The path planning forms a key part of the unmanned driving technologies, which is based on environment data of a recognition system, and a vehicle needs to plan a safe and reliable, shortest free-collision path from a starting position to a target position based on certain performance metrics in a complicated road environment.

The current method for planning a pass path is typically a planning method based on the Lattice algorithm, this method direct sets some pass candidate points homogeneously in all areas in front of an unmanned vehicle, in which these pass candidate points may be set on front obstacles, the method can then calculate respective pass paths, and select an optimal pass path in passable paths by excluding impassable paths that contact with obstacles.

The method for planning a pass path in current technologies increases unnecessary calculation of impassable paths, further increases a calculation amount of pass path planning, and decreases a planning speed of the pass path. Besides, since no driving strategy for the unmanned vehicle is considered when planning the pass path, thus leading to poor coupling between the planned path and the driving strategy.

SUMMARY

Embodiments of the present disclosure provide a method, an apparatus, a device and a readable storage medium for planning pass path, which solve the problem that the methods for planning a pass path would increase the unnecessary calculation of impassable paths, further increase a calculation amount of pass path planning, decrease a planning speed of the pass path, and lead to poor coupling between the planned path and the driving strategy since no driving strategy for the unmanned vehicle is considered when planning the pass path.

The first aspect of the embodiments of the present disclosure provides a method for planning a pass path, including: acquiring current road environment information in front of a vehicle; setting pass candidate points according to the current road environment information and a driving strategy; and determining a current optimal passable path according to the pass candidate points.

The second aspect of the embodiments of the present disclosure provides an apparatus for planning a pass path, including: a road environment data acquiring unit, configured to acquire current road environment information in front of a vehicle, a pass candidate point setting unit, configured to set pass candidate points according to the current road environment information and a driving strategy; and an optimal passable path determining unit, configured to determine a current optimal passable path according to the pass candidate points.

The third aspect of the embodiments of the present disclosure provides an electronic device, including: a memory, a processor and a computer program; in which, the computer program is stored in the memory, and configured to be executed by the processor to implement the method according to any one of the first aspect described above.

The fourth aspect of the embodiments of the present disclosure provides a computer readable storage medium, which stores a computer program, and the program is executed by the processor to implement the method according to any one of the first aspect described above.

According to the aspects described above, in the embodiments of the present disclosure, current road environment information in front of a vehicle is acquired; pass candidate points are set according to the current road environment information and a driving strategy; and a current optimal passable path is determined according to the pass candidate points. Since the pass candidate points are set according to the current road environment information and the driving strategy, and the current optimal passable path is determined according to the pass candidate points, thereby effectively decreasing the calculation amount of the impassable path calculation in prior art due to direct setting of pass candidate points in all areas in front of an unmanned vehicle, and further decreasing the calculation amount of the pass path planning, improving the planning speed of the pass path. Besides, on considering the driving strategy when planning the pass path, better coupling between the planned path and the driving strategy is achieved.

It should be understood that, the content described in the application content section described above is not intended to limit the key or important features of the embodiments of the present disclosure, nor is it intended to limit the scope of the present disclosure. Other features of the present disclosure will be easily understood from the following descriptions.

DESCRIPTION OF EMBODIMENTS

Embodiments of the present disclosure are hereinafter described in detail with reference to the accompanying drawings. Even though the accompanying drawings have shown some embodiments of the present disclosure, it should be appreciated that, the present disclosure could be implemented in various kinds of forms and should not be construed as a limitation to embodiments described herein, instead, these embodiments are used for understanding the present disclosure more thoroughly and completely. It should be understood that, the accompanying drawings and embodiments of the present disclosure are presented for illustrative purposes only and are not intended to limit the scope of the present disclosure.

The terms "first", "second", "third", "fourth" and so forth (if present) in the specification and claims of the embodiments of the present disclosure and the above accompanying drawings are used to distinguish similar objects, and are not necessary to describe a particular sequence or precedence order. It should be understood that the data used in such a manner may be interchanged in appropriate situations, so that the embodiments described herein can be implemented, for example, in a sequence other than those illustrated or described herein. In addition, the terms "include" and "comprise" and any transformation thereof are intended to cover a non-exclusive inclusion, for example, a process, a method, a system, a product or a device that comprises a series of steps or units, and are not necessarily limited to list those steps or units, while they may include other steps or units not explicitly listed or inherent to such processes, methods, products or devices.

Figure 1:
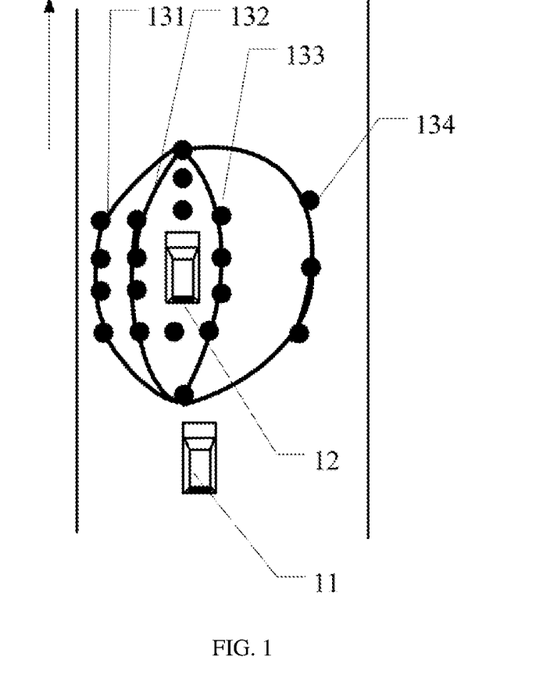
FIG. 1 is a schematic diagram of an application scenario of a method for planning a pass path according to an embodiment of the present disclosure.

An application scenario of a method for planning a pass path according to the embodiments of the present disclosure will be introduced as follows. FIG. 1 is a schematic diagram of an application scenario of a method for planning a pass path according to an embodiment of the present disclosure, as shown in FIG. 1, one application scenario of the method for planning a pass path provided in the embodiment of the present disclosure is: a scenario that an unmanned vehicle 11 is driving on an ultra-low speed highway. The speed range is 10 km/h-20 km/h or other speed range. When a recognizing apparatus of the unmanned vehicle detects current road environment information in front of a vehicle, the detected current road environment information may include: moving vehicle obstacle information and lane line information, etc. The current moving vehicle obstacle is a moving vehicle 12, the current road environment information in front of the vehicle is acquired by the recognizing apparatus, and the pass candidate points are set according to the current road environment information and a driving strategy, the driving strategy may be a car-following strategy, an overtaking strategy and so forth. When the pass candidate points are set according to the current road environment information and the driving strategy, the pass candidate points can be set densely in a car-following area located in a rear side of a moving vehicle obstacle as well as an overtaking area in left, right and front sides of the moving vehicle obstacle, and the candidate points can be set sparsely in a free driving space area. Finally, a current optimal passable path is determined according to the pass candidate points. The current optimal passable path may be selected from multiple pass paths 131, 132, 133 and 134, and the current optimal passable path is 133. According to the method for planning a pass path provided in the embodiments of the present disclosure, pass candidate points are set according to the current road environment information and the driving strategy, and a current optimal passable path is determined according to the pass candidate points, thereby effectively decreasing the calculation amount of the impassable path calculation in prior art due to direct setting of pass candidate points in all areas in front of an unmanned vehicle, and further decreasing the calculation amount of the pass path planning, improving the planning speed of the pass path. Besides, on considering the driving strategy when planning the pass path, better coupling between the planned path and the driving strategy is achieved.

The application scenario of the embodiments of the present disclosure may also be an application scenario where the pass path is planned in medium/low speed highways or express highways, or other application scenarios, which is not limited herein.

The embodiments of the present disclosure will be described in detail with reference to the drawings.

Embodiment 1

Figure 2:
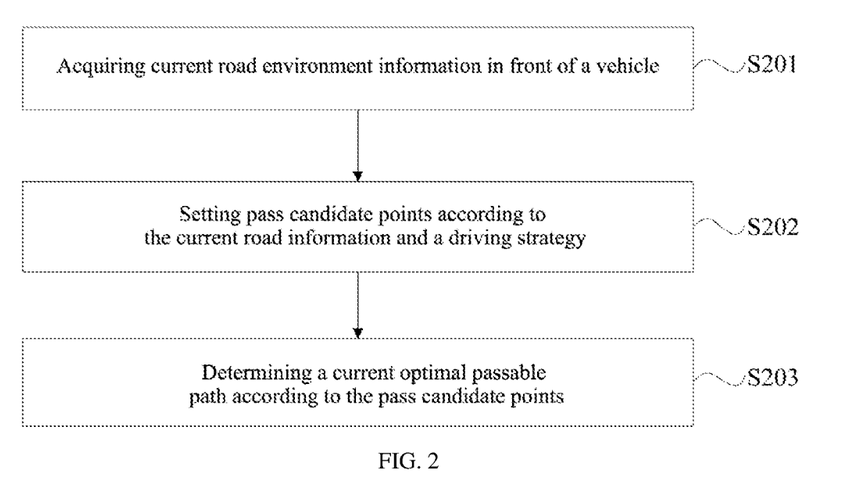
FIG. 2 is a flowchart of a method for planning a pass path according to Embodiment 1 of the present disclosure.

FIG. 2 is a flowchart of a method for planning a pass path according to Embodiment 1 of the present disclosure. As shown in FIG. 2, the execution subject of the embodiment of the present disclosure is an apparatus for planning a pass path, which can be integrated into an electronic device located in an unmanned vehicle. The method for planning a pass path provided in the embodiment includes the following steps.

Step 201: acquiring current road environment information in front of a vehicle.

Specifically, in the embodiment, the unmanned vehicle is configured with a recognizing apparatus, which may be a video collection apparatus, a laser radar apparatus and the like, the recognizing apparatus collects current road environment information in front of a vehicle, the apparatus for planning a pass path acquires the current road environment information in front of the vehicle from the recognizing apparatus.

Where the current road environment information can include: obstacle information and lane line information.

Where the obstacle information may include moving vehicle obstacle information, cycling personnel information and the like. The lane line information can be information about variety kinds of driving lane lines of the vehicle.

Step 202: setting pass candidate points according to the current road environment information and a driving strategy.

In the embodiment, the driving strategy can be a car-following strategy, an over-taking strategy and so forth.

Specifically, in the embodiment, setting the pass candidate points according to the current road environment information and the driving strategy can be setting the pass candidate points intensively in a car-following area located in a rear side of a moving vehicle obstacle and in an over-taking area located in left, right and front sides of the moving vehicle obstacle according to obstacle information in the current road environment information, lane line information and the driving strategy, and setting the candidate points sparsely in a free driving space area, in this way, when calculating the passable paths according to the pass candidate points, more passable pass paths may be obtained in the areas in which car-following and overtaking behaviors occur.

Step 203: determining a current optimal passable path according to the pass candidate points.

Specifically, in the embodiment, multiple passable paths from a current starting position to a current target position can be determined according to the pass candidate points, each passable path is formed by connecting multiple pass candidate points from the current starting position to the current target position, and the current optimal passable path can be selected from the multiple passable paths. The selection of the current optimal passable path from the multiple passable paths may be made on considering the security considerations, or comfortability or fuel consumption, which is not limited in the embodiment.

According to the method for planning a pass path provided in the embodiment, current road environment information in front of a vehicle is acquired; pass candidate points are set according to the current road environment information and a driving strategy; and a current optimal passable path is determined according to the pass candidate points. Since the pass candidate points are set according to the current road environment information and the driving strategy, and the current optimal passable path is determined according to the pass candidate points, thereby effectively decreasing the calculation amount of the impassable path calculation in prior art due to direct setting of pass candidate points in all areas in front of an unmanned vehicle, and further decreasing the calculation amount of the pass path planning, improving the planning speed of the pass path. Besides, on considering the driving strategy when planning the pass path, better coupling between the planned path and the driving strategy is achieved.

Embodiment 2

Figure 3:
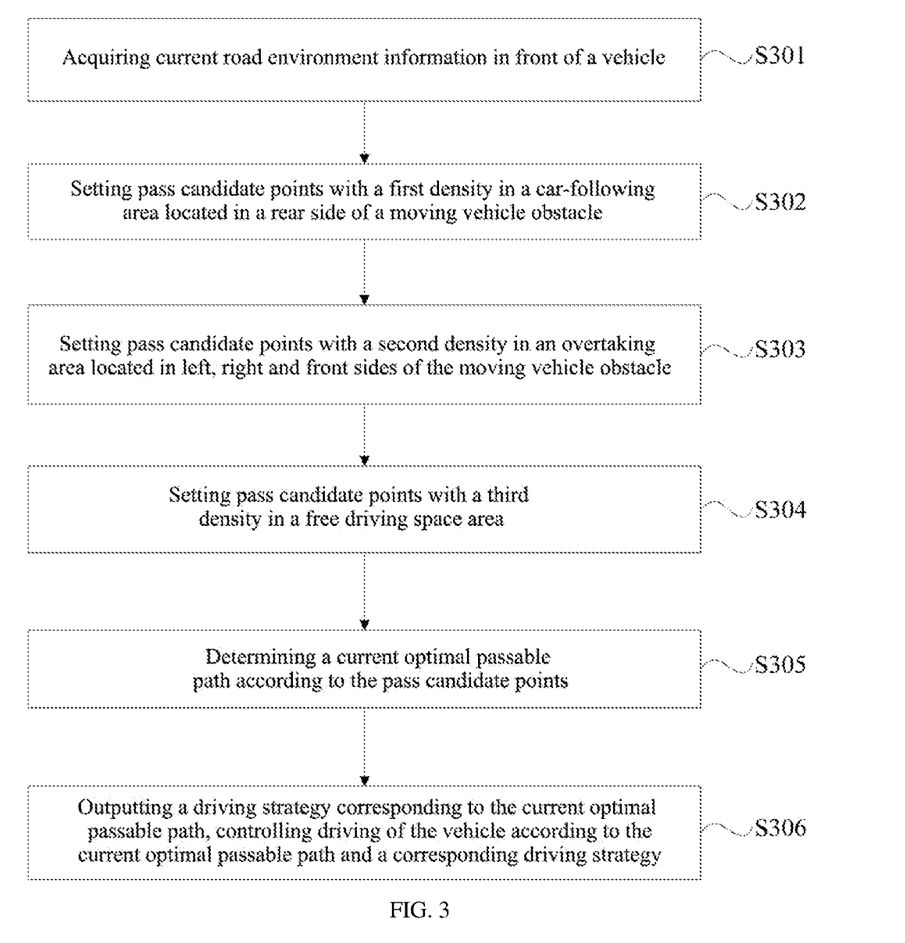
FIG. 3 is a flowchart of a method for planning a pass path according to Embodiment 2 of the present disclosure.

FIG. 3 is a flowchart of a method for planning a pass path according to Embodiment 2 of the present disclosure. As shown in FIG. 3, the method for planning a pass path provided in the embodiment further elaborates Step 201 to Step 203 on the basis of the method for planning a pass path according to Embodiment 1 of the present disclosure, and can further include steps of outputting a driving strategy corresponding to the current optimal passable path; and controlling driving of the vehicle according to the current optimal pass path and a corresponding driving strategy. The method for planning a pass path provided in the embodiment may include the following steps.

Step 301: acquiring current road environment information in front of a vehicle.

Furthermore, in the embodiment, the current road environment information includes moving vehicle obstacle information and lane line information.

Specifically, the obstacle information in the current road environment information acquired by a recognizing apparatus includes the moving vehicle obstacle information.

Step 302: setting pass candidate points with a first density in a car-following area located in a rear side of a moving vehicle obstacle.

Where the car-following area located in the rear side of the moving vehicle obstacle is an area located in the rear side of the moving vehicle obstacle which is larger or equal to the area occupied by the unmanned vehicle.

Step 303: setting pass candidate points with a second density in an overtaking area located in left, right and front sides of the moving vehicle obstacle.

Where the overtaking area located in the left and right sides of the moving vehicle obstacle is an area located in the left side and/or right side of the moving vehicle obstacle which is larger or equal to the area occupied by the unmanned vehicle. The overtaking area located in the front side of the moving vehicle obstacle is an area located in the front side of the moving vehicle obstacle which is larger or equal to the area occupied by the unmanned vehicle.

Step 304: setting the pass candidate points with a third density in a free driving space area.

Where the free driving space area is an area which is away from the moving vehicle obstacle located in the lane lines and is larger or equal to the area occupied by the unmanned vehicle.

Where the first density is greater than the second density, and the second density is greater than the third density.

Specifically, description is made in combination with steps 302-304, in the embodiment, the pass candidate points are set with the first density and the second density respectively in the car-following area located in the rear side of the moving vehicle obstacle and in the overtaking area located in the left, right and front sides of the moving vehicle obstacle, the magnitudes of the first density and the second density are greater than the magnitude of the third density, that is, the pass candidate points are set with a high density in the car-following area located in the rear side of the moving vehicle obstacle and the overtaking area located in the left, right and front sides of the moving vehicle obstacle, while the pass candidate points are set with the third density in the free driving space area, which means the pass candidate points are set sparsely in the free driving space area.

Where the first density may be equal to the second density, or the first density may be greater or smaller than the second density, which is not limited in the embodiment.

It should be explained that, Step 302 to Step 304 are further elaborations of Step 202 in Embodiment 1 of the present disclosure.

Step 305: determining a current optimal passable path according to the pass candidate points.

Figure 4:
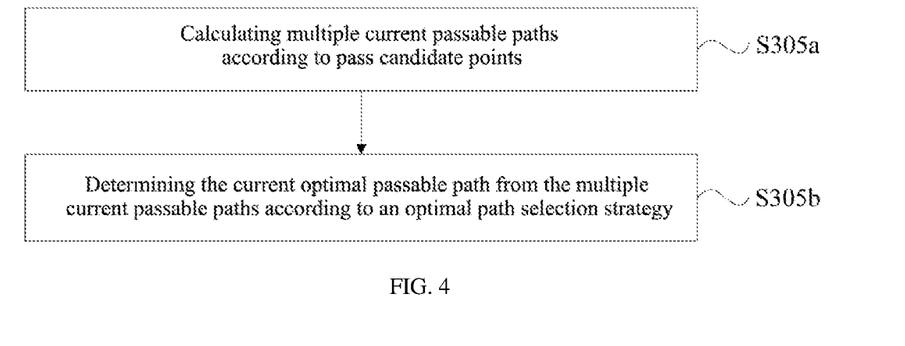
FIG. 4 is a flowchart of Step 305 of a method for planning a pass path according to Embodiment 2 of the present disclosure.

Furthermore, FIG. 4 is a flowchart of Step 305 of a method for planning a pass path according to Embodiment 2 of the present disclosure. As shown in FIG. 4, in the embodiment, Step 305 includes the following steps.

Step 305a: calculating multiple current passable paths according to the pass candidate points.

Preferably, in the embodiment, the calculating multiple current passable paths according to the pass candidate points specifically includes:

calculating the multiple current passable paths with a path determining algorithm according to the pass candidate points.

Specifically, in the embodiment, information about the pass candidate points is used as an input of the path determining algorithm, and multiple current passable paths may be calculated according to the information about the pass candidate points. Each current passable path includes multiple pass candidate points connected in turn.

Where the path determining algorithm can be the Lattice algorithm or an improved expectation-maximization (EM) algorithm, or other path determining algorithms, which is not limited herein.

Step 305b: determining the current optimal passable path from the multiple current passable paths according to an optimal path selection strategy.

Figure 5:
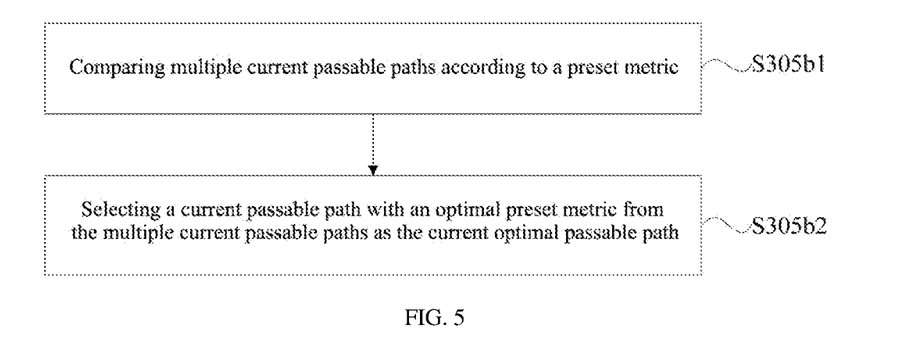
FIG. 5 is a flowchart of Step 305b of a method for planning a pass path according to Embodiment 2 of the present disclosure.

Furthermore, FIG. 5 is a flowchart of Step 305b of a method for planning a pass path according to Embodiment 2 of the present disclosure. As shown in FIG. 5, in the embodiment, Step 305b includes the following steps:

Step 305b1: comparing the multiple current passable paths according to a preset metric.

Furthermore, the preset metric includes any one or more of the following metrics: a security metric, a fuel consumption metric and a comfortability metric.

Specifically, in the embodiment, the preset metric in the optimal path selection strategy which needs to be referred to may be determined firstly, the metric needs to be referred to may be any one or more of the following metrics: a security metric, a fuel consumption metric and a comfortability metric. Then values of the preset metric corresponding to each current passable path, if there is a plurality kinds of preset metrics, the value of the preset metric is a weighted sum of individual preset metrics. Finally, the multiple current passable paths are compared according to the preset metric.

Where the security metric at least includes: a distance metric between the current passable path to the moving vehicle obstacle and the lane line; the fuel consumption metric at least includes: the number of steps to step on an accelerator; and the comfortability metric at least includes: a curvature metric of the current passable path.

Where if the security metric includes: the distance metric between the current passable path to the moving vehicle obstacle and the lane line, then if a distance between the current passable path and the moving vehicle obstacle can most satisfy a corresponding safe distance range, and a distance between the current passable path and the lane line can most satisfy the corresponding safe distance range, then the security metric is the optimal. If the fuel consumption metric includes: the number of steps to step on the accelerator, the fewer times the accelerator is stepped on, the less fuel consumption is, and the better the fuel consumption metric is. If the comfortability metric is the curvature metric of the current passable path, then the smoother the curvature index of the current passable path is, the smaller the centrifugal force, the better the comfortability metric.

Step 350b2: selecting a current passable path with an optimal preset metric from the multiple current passable paths as the current optimal passable path.

Furthermore, in the embodiment, if the optimal path selection strategy simply includes the security metric, then the current optimal pass path is determined from the multiple current passable paths according to the security metrics corresponding to the multiple current passable paths. Where the current passable path with the best security metric is determined as the current optimal passable path.

If the optimal path selection strategy simply includes the fuel consumption metric, the current optimal pass path is determined from the multiple current passable paths according to the fuel consumption metrics corresponding to the multiple current passable paths. Where the current passable path with the best fuel consumption metric is determined as the current optimal passable path.

If the optimal path selection strategy simply includes the comfortability metric, the current optimal pass path is determined from the multiple current passable paths according to the comfortability metric corresponding to the multiple current passable paths. Where the current passable path with the best comfortability metric is determined as the current optimal passable path.

If the optimal path selection strategy includes multiple preset metrics, the current optimal pass path is determined from the multiple current passable paths according to the multiple preset metrics corresponding to the multiple current passable paths. For the determination, the values corresponding to each multiple preset metrics may be normalized, weighted and summed to obtain a total metric, and the total metrics are compared to determine an optimal total metric, and the current passable path corresponding to the optimal total metric is determined as the current optimal passable path.

Step 306: outputting a driving strategy corresponding to the current optimal passable path, and controlling driving of the vehicle according to the current optimal passable path and the corresponding driving strategy.

Furthermore, in the embodiment, outputting the driving strategy corresponding to the current optimal passable path, if the driving strategy corresponding to the current optimal passable path is a car-following strategy, then outputting the car-following strategy; if the driving strategy corresponding to the current optimal passable path is an overtaking strategy, then outputting the overtaking strategy. The vehicle is controlled to drive according to the current optimal passable path and the corresponding driving strategy. If the driving strategy is the car-following strategy, the vehicle is controlled to perform car-following according to the current optimal passable path; if the driving strategy is the overtaking strategy, the vehicle is controlled to overtake according to the current optimal passable path.

According to the method for planning a traffic path provided in the embodiment, current road environment information in front of a vehicle is acquired, pass candidate points are set with a first density in a car-following area located in a rear side of a moving vehicle obstacle; pass candidate points are set with a second density in an overtaking area located on left, right and front sides of the moving vehicle obstacle; and pass candidate points are set with a third density in a free driving space area; where the first density is greater than the third density, and the second density is greater than the third density, the current optimal passable path is determined according to the pass candidate points, a driving strategy corresponding to the current optimal passable path is output, and the vehicle is controlled to drive according to the current optimal passable path and a corresponding driving strategy. Comparing with Embodiment 1 of the present disclosure, the driving strategy including a car-following strategy and an overtaking strategy can be coupled into solving the passable path, in this way, the current optimal passable path is solved, meanwhile, the solved current passable path is more consistent with the optimal driving strategy, thereby improving a decision making ability in the driving of the unmanned vehicle without making a decision of a preferred driving strategy after solving the current optimal passable path.

Embodiment 3

Figure 6:
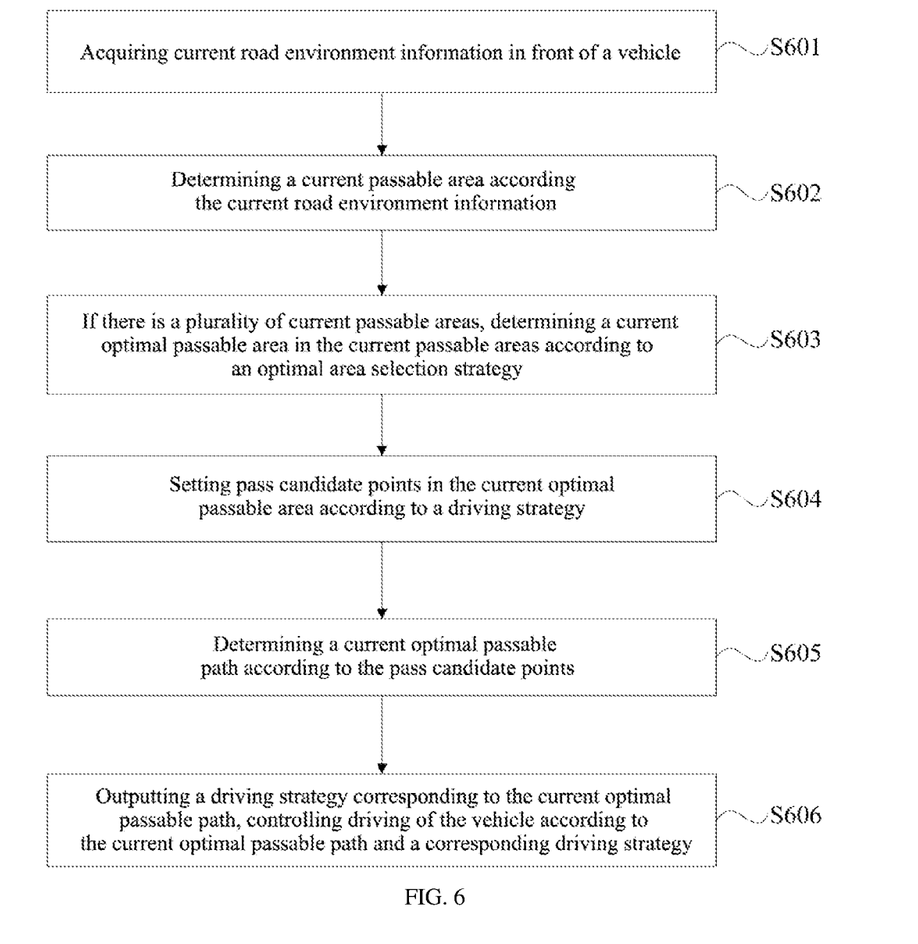
FIG. 6 is a flowchart of a method for planning a pass path according to Embodiment 3 of the present disclosure.

FIG. 6 is a flowchart of a method for planning a pass path according to Embodiment 3 of the present disclosure. As shown in FIG. 6, the method for planning a pass path provided in the embodiment further elaborates Step 201-Step 203 on the basis of the method for planning a pass path in Embodiment 1 of the present disclosure, thus the method for planning a pass path provided in the embodiment includes the following steps.

Step 601: acquiring current road environment information in front of a vehicle.

Furthermore, in the embodiment, the current road environment information includes moving vehicle obstacle information and lane line information.

Step 602: determining a current passable area according to the current road environment information.

Figure 7:
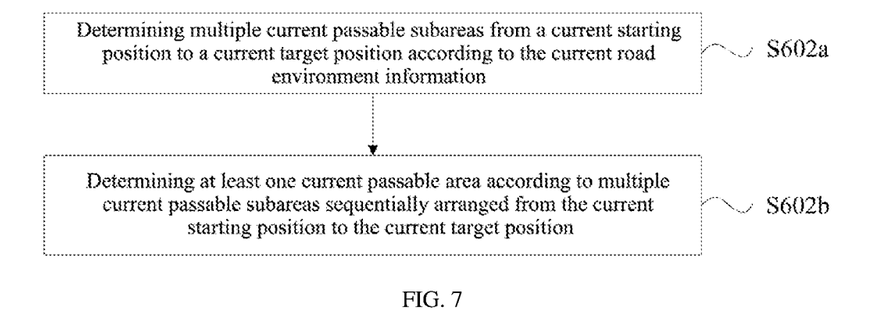
FIG. 7 is a flowchart of Step 602 of a method for planning a pass path according to Embodiment 3 of the present disclosure.

Furthermore, in the embodiment, FIG. 7 is a flowchart of Step 602 of a method for planning a pass path according to Embodiment 3 of the present disclosure. As shown in FIG. 7, in the embodiment, Step 602 includes the following steps.

Step 602a: determining multiple current passable subareas from a current starting position to a current target position according to the current road environment information.

Furthermore, in the embodiment, determining, in an area from the current starting position to the current target position inside the lane line, multiple current passable subareas excluding the moving vehicle obstacle according to the lane line information and the moving vehicle obstacle information in the current road environment information. Each current passable subarea may be constructed by a latter with an area larger than or equal to an area occupied by the vehicle. The current passable subareas are arranged next to each other.

Step 602b: determining at least one current passable area according to multiple current passable subareas sequentially arranged from the current starting position to the current target position.

Furthermore, in the embodiment, from the current starting position to the current target position inside the lane line may include multiple current passable paths, when each of the current passable paths is determined, if there are multiple passable subareas from one passable subarea to another passable subarea, each of the next passable subareas that is branched out is assigned with a corresponding current passable area. Multiple current passable areas share a common current starting position and a current target position thereamong.

Step 603: if there is a plurality of current passable areas, determining a current optimal passable area in the current passable areas according to an optimal area selection strategy.

Furthermore, in the embodiment, the optimal area selection strategy may be to select, in the multiple current passable areas, a current passable area which has the least distance to a target average position as the current optimal passable area, or to select a current passable area, which has the farthest distance to an edge of the lane line, that is, which is located nearest to a center of the lane line as the current optimal passable area, or may be other selection strategies, which is not limited herein.

Step 604: setting pass candidate points in the current optimal passable area according to a driving strategy.

Figure 8:
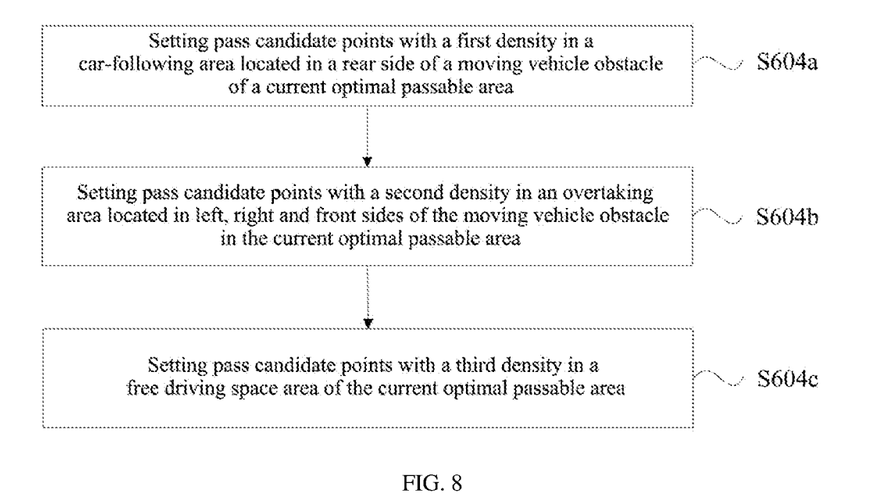
FIG. 8 is a flowchart of Step 604 of a method for planning a pass path according to Embodiment 3 of the present disclosure.

Furthermore, in the embodiment, FIG. 8 is a flowchart of Step 604 of a method for planning a pass path according to embodiment 3 of the present disclosure.

As shown in FIG. 8, Step 604 includes the following steps.

Step 604a: setting pass candidate points with a first density in a car-following area located in a rear side of a moving vehicle obstacle in the current optimal passable area.

Step 604b: setting pass candidate points with a second density in an overtaking area located in left, right and front sides of the moving vehicle obstacle in the current optimal passable area.

Step 604c: setting pass candidate points with a third density in a free driving space area of the current optimal passable area.

Where the first density is greater than the second density, and the second density is greater than the third density.

Specifically, description is made in combination with Step 604a to Step 604c, in the embodiment, in order to narrow a range for setting pass candidate points, when setting the pass candidate points, all the pass candidate points are set in the current optimal passable area. Furthermore, the pass candidate points are set with the first density and the second density in the car-following area located in a rear side of a moving vehicle obstacle in the current optimal passable area and the overtaking area located in left, right and front sides of the moving vehicle obstacle in the current optimal passable area respectively, in which the magnitudes of the first and second density are greater than the magnitude of the third density, that is, the pass candidate points are set with a high density in the car-following area located in a rear side of a moving vehicle obstacle in the current optimal passable area and in the overtaking area located in left, right and front sides of the moving vehicle obstacle in the current optimal passable area, and the pass candidate points are set with the third density in the free driving space area of the current optimal passable area, which means the pass candidate points are set sparsely in the free driving space area.

Step 605: determining a current optimal passable path according to the pass candidate points.

Step 606: outputting a driving strategy corresponding to the current optimal passable path, controlling driving of the vehicle according to the current optimal passable path and a corresponding driving strategy.

In the embodiment, the implementation of Step 605 to Step 606 is similar to the implementation of Step 305 to Step 306 in Embodiment 1 of the present disclosure, which will not be described in detail herein.

According to the method for planning a pass path provided in the embodiment, current road environment information is acquired, the current passable area is determined according to the current road environment information, if there is a plurality of current passable areas, then the current optimal passable area can be determined according to an optimal area selection strategy in the current passable areas, the pass candidate points can be set in the current optimal passable area according to the driving strategy. Comparing with the method for planning a pass path provided in Embodiment 1 of the present disclosure, after determining the current passable areas according to the current road environment information, the current optimal passable path can be determined in the current passable areas, the pass candidate points can be set in the optimal passable area and the current optimal pass path can be calculated according to the pass candidate points, thereby further reducing a range for setting the pass candidate points, reducing the unnecessary calculations for the current pass paths as well as the calculation amount of the pass path planning, and improving the planning speed of the pass path.

According to the method for planning a pass path provided in the embodiment, when setting the pass candidate points in the current optimal passable area according to the driving strategy, the pass candidate points can be set with the first density in the car-following area located in a rear side of a moving vehicle obstacle in the current optimal passable area, the pass candidate points can be set with the second density in the overtaking area located in left, right and front sides of the moving vehicle obstacle in the current optimal passable area, the pass candidate points can be set with the third density in the free driving space area of the current optimal passable area, therefore, the pass candidate points can be set distinguishingly according to the driving strategy of an unmanned vehicle, the driving strategy including a car-following strategy and an overtaking strategy can be coupled into solving the passable path, in this way, the current optimal passable path is solved, meanwhile, the solved current passable path is more consistent with the optimal driving strategy, thereby improving a decision making ability in the driving of the unmanned vehicle without making a decision of a preferred driving strategy after solving the current optimal passable path.

Embodiment 4

Figure 9:
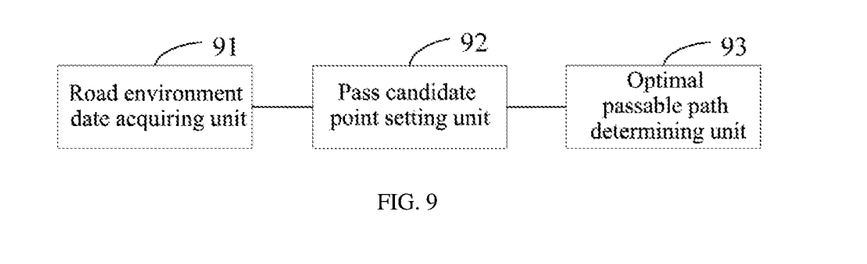
FIG. 9 is a schematic structural diagram of an apparatus for planning a pass path according to Embodiment 4 of the present disclosure.

FIG. 9 is a schematic structural diagram of an apparatus for planning a pass path according to Embodiment 4 of the present disclosure. As shown in FIG. 9, the method for planning a pass path includes: a road environment data acquiring unit 91, a pass candidate point setting unit 92 and an optimal passable path determining unit 93.

Where the road environment data acquiring unit 91 is configured to acquire current road environment information in front of a vehicle. The pass candidate point setting unit 92 is configured to set pass candidate points according to the current road environment information and a driving strategy. The optimal passable path determining unit 93 is configured to determine a current optimal passable path according to the pass candidate points.

The apparatus for planning a pass path provided in the embodiment can perform the technical solution shown in the method embodiment of FIG. 2, it follows a similar implementation principle and provides similar technical effects, which will not be described in detail herein again.

Embodiment 5

Figure 10:
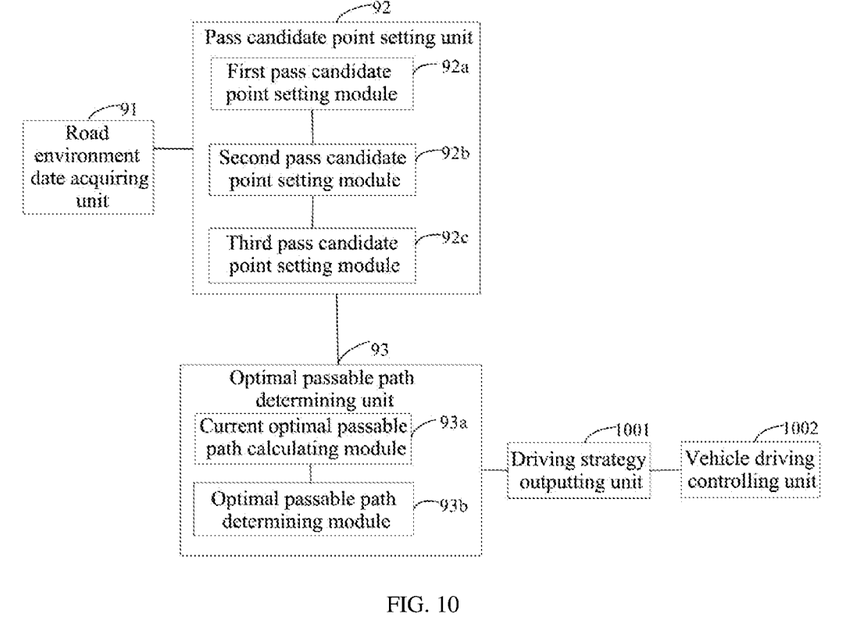
FIG. 10 is a schematic structural diagram of an apparatus for planning a pass path according to Embodiment 5 of the present disclosure.

FIG. 10 is a schematic structural diagram of an apparatus for planning a pass path according to Embodiment 5 of the present disclosure. As shown in FIG. 10, the apparatus for planning a pass path provided in the embodiment is on the basis of the apparatus for planning a pass path, which further includes a driving strategy outputting unit 1001 and a vehicle driving controlling unit 1002.

Furthermore, the pass candidate setting unit 92 specifically includes a first candidate point setting module 92a, a second candidate point setting module 92b and a third candidate point setting module 92c.

Where the first candidate point setting module 92a is configured to set pass candidate points with a first density in a car-following area located in a rear side of a moving vehicle obstacle. The second candidate point setting module 92b is configured to set pass candidate points with a second density in an overtaking area located in left, right and front sides of the moving vehicle obstacle. The third candidate point setting module 92c is configured to set pass candidate points with a third density in a free driving space area of the current optimal passable area, where the first density is greater than the second density and the second is greater than the third density.

Furthermore, the optimal passable path determining unit 93 specifically includes a current passable path calculating module 93a and an optimal passable path determining module 93b.

Where the current passable path calculating module 93a is configured to calculate multiple current passable paths according to the pass candidate points. The optimal passable path determining module 93b is configured to determine the current optimal passable path from the multiple current passable paths according to an optimal path selection strategy.

Furthermore, the current passable path calculating module 93a is specifically configured to calculate the multiple current passable paths with a path determining algorithm according to the pass candidate points.

Furthermore, the optimal passable path determining module 93b is specifically configured to compare the multiple current passable paths according to a preset metric; and select a current passable path with an optimal preset metric from the multiple current passable paths as the current optimal passable path.

Where the preset metric includes any one or more of the following metrics: a security metric, a fuel consumption metric and a comfortability metric.

Furthermore, the driving strategy outputting unit 1001 is configured to output a driving strategy corresponding to the current optimal passable path. The vehicle driving controlling unit 1002 is configured to control driving of the vehicle according to the current optimal passable path and a corresponding driving strategy.

The apparatus for planning a pass path provided in the embodiment can perform the technical solution in the method embodiment of FIG. 3-FIG. 5, it follows a similar implementation principle and provides similar technical effects, which will not be described in detail herein again.

Embodiment 6

Figure 11:
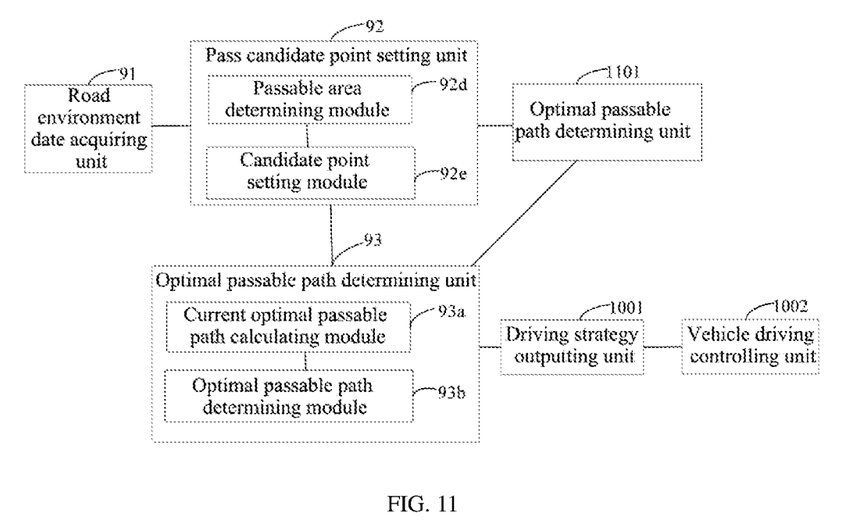
FIG. 11 is a schematic structural diagram of an apparatus for planning a pass path according to Embodiment 6 of the present disclosure.

FIG. 11 is a schematic structural diagram of an apparatus for planning a pass path according to Embodiment 6 of the present disclosure. As shown in FIG. 11, the apparatus for planning a pass path provided in the embodiment is on the basis of the apparatus for planning a pass path provided in Embodiment 4 of the present disclosure, which further includes a driving strategy outputting unit 1001, a vehicle driving controlling unit 1002 and an optimal passable area determining unit 1101.

Furthermore, the pass candidate point setting unit 92 specifically includes a passable area determining module 92d and a candidate point setting module 92e.

Where the passable area determining module 92d is configured to determine a current passable area according to road environment information. The candidate point setting module 92e is configured to set pass candidate points in the current passable area according to a driving strategy.

Furthermore, the optimal passable area determining module 1101 is configured to, if there is a plurality of current passable areas, determine a current optimal passable area in the current passable areas according an optimal area selection strategy. Accordingly, the candidate point setting module 92e is specifically configured to set pass candidate points in the current optimal passable area according to the driving strategy.

Furthermore, the current road environment information includes moving vehicle obstacle information and lane line information; the candidate point setting module 92e is specifically configured to set pass candidate points with a first density in a car-following area located in a rear side of a moving vehicle obstacle in the current optimal passable area; set pass candidate points with a second density in an overtaking area located in left, right and front sides of the moving vehicle obstacle in the current optimal passable area; and set pass candidate points with a third density in a free driving space area of the current optimal passable area; where the first density is greater than the second density and the second is greater than the third density.

Furthermore, the passable area determining module 92d is specifically configured to determine multiple current passable subareas from a current starting position to a current target position according to the current road environment information; and determine at least one current passable area according to the multiple current passable subareas sequentially arranged from the current starting position to the current target position.

Furthermore, the optimal passable path determining unit 93 specifically includes a current passable path calculating module 93a and an optimal passable path determining module 93b.

Where the current passable path calculating module 93a is configured to calculate multiple current passable paths according to the pass candidate points. The optimal passable path determining module 93b is configured to determine the current optimal passable path from the multiple current passable paths according to an optimal path selection strategy.

Furthermore, the current passable path calculating module 93a is specifically configured to calculate the multiple current passable paths with a path determining algorithm according to the pass candidate points.

Furthermore, the optimal passable path determining module 93b is specifically configured to compare the multiple current passable paths according to a preset metric; and select a current passable path with an optimal preset metric from the multiple current passable paths as the current optimal passable path.

Where the preset metric includes any one or more of the following metrics: a security metric, a fuel consumption metric and a comfortability metric.

Furthermore, the driving strategy outputting unit 1001 is configured to output a driving strategy corresponding to the current optimal passable path. The vehicle driving controlling unit 1002 is configured to control driving of the vehicle according to the current optimal passable path and a corresponding driving strategy.

The apparatus for planning a pass path provided in the embodiment can perform the technical solution in the method embodiment of FIG. 6-FIG. 8, it follows a similar implementation principle and provides similar technical effects, which will not be described in detail herein again.

Embodiment 7

Figure 12:
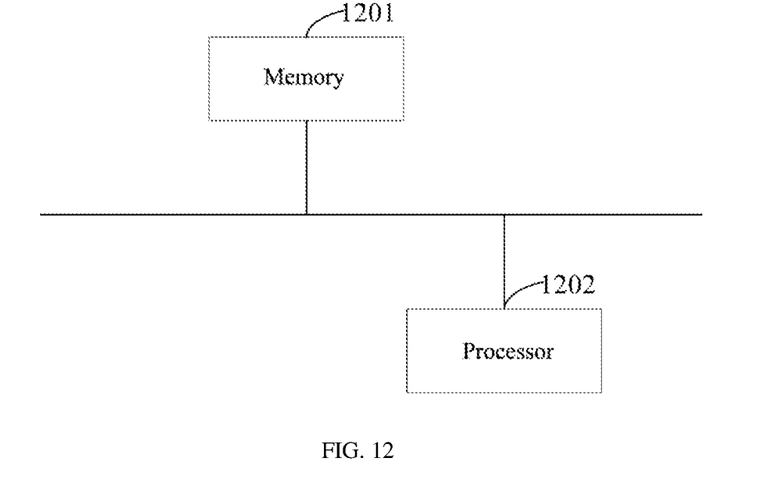
FIG. 12 is a schematic structural diagram of an electronic device according to Embodiment 7 of the present disclosure.

FIG. 12 is a schematic structural diagram of an electronic device according to Embodiment 7 of the present disclosure. As shown in FIG. 12, the electronic device provided in the embodiment includes: a memory 1201, a processor 1202 and a computer program.

Where the computer program is stored in the memory 1201, and configured to be executed by the processor 1202 to implement the method for planning a pass path provided in Embodiment 1 of the present disclosure or the method for planning a pass path provided in Embodiment 2 of the present disclosure.

Reference may be made to corresponding relative descriptions of FIG. 1 to FIG. 8 for relative explanations, which will not be described in detail herein.

The electronic device provided in the embodiment includes a memory, a processor and a computer program. The computer program is stored in the memory, and configured to be executed by the processor to implement the method for planning a pass path provided in Embodiment 1 of the present disclosure to Embodiment 3 of the present disclosure. Since the pass candidate points are set according to the current road environment information and the driving strategy, and the current optimal passable path is determined according to the pass candidate points, thereby effectively decreasing the calculation amount of the impassable path calculation in prior art due to direct setting of pass candidate points in all areas in front of an unmanned vehicle, and further decreasing the calculation amount of the pass path planning, improving the planning speed of the pass path. Besides, on considering the driving strategy when planning the pass path, better coupling between the planned path and the driving strategy is achieved.

Embodiment 8

Embodiment 8 of the present disclosure provides a computer readable storage medium storing a computer program, and the computer program is executed by the processor to implement the method for planning a pass path provided in Embodiment 1 of the present disclosure to Embodiment 3 of the present disclosure.

The embodiment of the present disclosure provides a computer readable storage medium storing a computer program, and the computer program is executed by the processor to implement the method for planning a pass path provided in Embodiment 1 of the present disclosure to Embodiment 3 of the present disclosure. Since the pass candidate points are set according to the current road environment information and the driving strategy, and the current optimal passable path is determined according to the pass candidate points, thereby effectively decreasing the calculation amount of the impassable path calculation in prior art due to direct setting of pass candidate points in all areas in front of an unmanned vehicle, and further decreasing the calculation amount of the pass path planning, improving the planning speed of the pass path. Besides, on considering the driving strategy when planning the pass path, better coupling between the planned path and the driving strategy is achieved.

In the embodiments of the present disclosure, it should be appreciated that, the disclosed apparatus and method can be implemented in other forms. For example, the apparatus embodiment described above is merely illustrative, for instance, the partition of modules is merely a partition in terms of logical functions, when implemented in practice other partition methods may be applied, for example, multiple modules and units may be combined or integrated into another system, or some features of which may be ignored or unexecuted. On the other hand, the displayed or discussed coupling to each other, or direct coupling or communicative connections may be indirect coupling or communicative connections through some modules, ports or apparatus, and may be electrical, mechanical or in other forms.

The modules explained as separate parts may be or may not be physically separated, the components displayed as modules may be or may not be physical modules, they may be located in one place or distributed in multiple network modules. Some or all of the modules may be selected according to actual needs to implement the purposes of the solutions of the embodiments.

Furthermore, the functional modules in the embodiments of the present disclosure may be integrated into one processing module, or may exist as individual modules, or two or more than two modules may be integrated into one module. The integrated module described above may be implemented in the form of hardware or in the form of a combination of hardware and software functional modules.

The program codes used for implementing the method of the present disclosure may be programed with any combination of one or more programming languages. These program codes may be provided to a general purpose computer, a special purpose computer or other processors or controllers of programmable data processing apparatus, so that the program codes, when executed by processors or controllers, enable the implementation of functions/operations specified in flowcharts/diagrams. The program codes may be entirely or partly implemented on a machine, or as a separate software packet, may also be partly executed on a machine and partly executed on a remote machine, or may be entirely executed on a remote machine or a server.

In the context of the present disclosure, the machine readable medium may be a physical medium, which may include or store programs to be used by an instruction execution system, apparatus or device, or to be used in combination with an instruction execution system, apparatus or device. The machine readable medium may be a machine readable signal medium or a machine readable storage medium. The machine readable medium may include, but is not limited to, electronic, magnetic, optical, electromagnetic, infrared, or semiconductor systems, apparatus or devices, or any suitable combination of the above. More specific examples of machine readable storage medium will include an electrical connection based on one or more wires, a portable computer disk, a hard disk, a random access memory (RAM), a read-only memory (ROM), an erasable programmable read-only memory (EPROM or Flash memory), an optical fiber, a compact disk read-only memory (CD-ROM), an optical storage device, a magnetic storage device, or any suitable combination of the above.

Besides, although operations are depicted in a specific order, this should be understood as such operations being required to be performed in a specified order or in a subsequent order as shown, or all illustrated operations being required to be performed to achieve desired results. Under certain circumstances, multitasking and parallel processing may be advantageous. Similarly, although a number of specific implementation details are included in the above discussion, these should not be construed as restrictions on the scope of the present disclosure. Some features described in the context of individual embodiments may also be implemented in combination in a single implementation. Conversely, the various features described in the context of a single implementation can also be implemented in multiple implementations individually or in any suitable combination of sub-implementations. Although the subject has been described in language specific to structural features and/or method logical actions, it should be understood that the subject defined in the appended claims is not necessarily limited to the specific features or actions described above. On the contrary, the specific features and actions described above are only examples of the implementation of claims.

What is claimed is:

1. A method for planning a pass path, performed by a processor, the method comprising:
    acquiring current road environment information in front of a vehicle;
    setting pass candidate points according to the current road environment information and a driving strategy, wherein the current road environment information comprises: moving vehicle obstacle information and lane line information;
    determining a current optimal passable path according to the pass candidate points; and
    controlling driving of the vehicle according to the current optimal passable path and a corresponding driving strategy;
    wherein the setting pass candidate points according to the current road environment information and the driving strategy comprises:
    setting pass candidate points with a first density in a car-following area located in a rear side of a moving vehicle obstacle;
    setting pass candidate points with a second density in an overtaking area located in left, right and front sides of the moving vehicle obstacle; and
    setting pass candidate points with a third density in a free driving space area;
    wherein the first density is greater than the second density, and the second density is greater than the third density.

2. The method according to claim 1, wherein the setting pass candidate points according to the current road environment information and the driving strategy further comprises:
    determining a current passable area according to the road environment information.

3. The method according to claim 2, wherein after the determining a current passable area according to the road environment information, the method further comprises:
    when there is a plurality of current passable areas, determining a current optimal passable area in the current passable areas according to an optimal area selection strategy.

4. The method according to claim 3, wherein
    the setting pass candidate points with the first density in the car-following area located in the rear side of the moving vehicle obstacle comprises setting pass candidate points with the first density in the car-following area located in the rear side of the moving vehicle obstacle in the current optimal passable area;
    the setting pass candidate points with the second density in the overtaking area located in the left, right and front sides of the moving vehicle obstacle comprises setting pass candidate points with the second density in the overtaking area located in the left, right and front sides of the moving vehicle obstacle in the current optimal passable area; and
    the setting pass candidate points with the third density in the free driving space area comprises setting pass candidate points with the third density in the free driving space area of the current optimal passable area.

5. The method according to claim 2, wherein the determining a current passable area according to the road environment information comprises:
    determining multiple current passable subareas from a current starting position to a current target position according to the current road environment information; and determining at least one current passable area according to the multiple current passable subareas sequentially arranged from the current starting position to the current target position.

6. The method according to claim 1, wherein the determining a current optimal passable path according to the pass candidate points comprises:
calculating multiple current passable paths according to the pass candidate points; and
determining the current optimal passable path from the multiple current passable paths according to an optimal path selection strategy.

7. The method according to claim 6, wherein the calculating multiple current passable paths according to the pass candidate points comprises:
calculating the multiple current passable paths with a path determining algorithm according to the pass candidate points.

8. The method according to claim 6, wherein the determining a current optimal passable path from the multiple current passable paths according to an optimal path selection strategy comprises:
comparing the multiple current passable paths according to a preset metric; and
selecting a current passable path with an optimal preset metric from the multiple current passable paths as the current optimal passable path.

9. The method according to claim 8, wherein the preset metric comprises any one or more of the following metrics:
a security metric, a fuel consumption metric and a comfortability metric.

10. The method according to claim 8, wherein after the selecting a current passable path with an optimal preset metric from multiple current passable paths as the current optimal passable path, the method further comprises:
outputting a driving strategy corresponding to the current optimal passable path.

11. An apparatus for planning a pass path, comprising: a memory, a processor and a computer program;
wherein the computer program is stored in the memory, and is configured to be executed by the processor to cause the processor to:
acquire current road environment information in front of a vehicle;
set pass candidate points according to the current road environment information and a driving strategy, wherein the current road environment information comprises: moving vehicle obstacle information and lane line information;
determine a current optimal passable path according to the pass candidate points; and
control driving of the vehicle according to the current optimal passable path and a corresponding driving strategy;
wherein the computer program is configured to be executed by the processor to cause the processor to:
set pass candidate points with a first density in a car-following area located in a rear side of a moving vehicle obstacle;
set pass candidate points with a second density in an overtaking area located in left, right and front sides of the moving vehicle obstacle; and
set pass candidate points with a third density in a free driving space area;
wherein the first density is greater than the second density, and the second density is greater than the third density.

12. The apparatus according to claim 11, wherein the computer program is configured to be executed by the processor to cause the processor to:
determine a current passable area according to the road environment information.

13. The apparatus according to claim 12, wherein the computer program is configured to be executed by the processor to further cause the processor to:
when there is a plurality of current passable areas, determine a current optimal passable area in the current passable areas according to an optimal area selection strategy.

14. The apparatus according to claim 13, wherein
the computer program is configured to be executed by the processor to cause the processor to:
set pass candidate points with a first density in a car-following area located in a rear side of a moving vehicle obstacle in the current optimal passable area;
set pass candidate points with a second density in an overtaking area located in left, right and front sides of the moving vehicle obstacle in the current optimal passable area; and
set pass candidate points with a third density in a free driving space area of the current optimal passable area.

15. The apparatus according to claim 12, wherein the computer program is configured to be executed by the processor to cause the processor to:
determine multiple current passable subareas from a current starting position to a current target position according to the current road environment information; and
determine at least one current passable area according to the multiple current passable subareas sequentially arranged from the current starting position to the current target position.

16. The apparatus according to claim 11, wherein the computer program is configured to be executed by the processor to cause the processor to:
calculate multiple current passable paths according to the pass candidate points; and
determine the current optimal passable path from the multiple current passable paths according to an optimal path selection strategy.

17. The apparatus according to claim 16, wherein the computer program is configured to be executed by the processor to cause the processor to:
calculate the multiple current passable paths with a path determining algorithm according to the pass candidate points.

18. A non-transitory computer readable storage medium storing a computer program, wherein the program is executed by a processor to implement the method according to claim 1.

* * * * *